(12) United States Patent
Beck et al.

(10) Patent No.: US 9,206,884 B2
(45) Date of Patent: Dec. 8, 2015

(54) MULTISTAGE TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/379,763

(22) PCT Filed: Feb. 1, 2013

(86) PCT No.: PCT/EP2013/051982
§ 371 (c)(1),
(2) Date: Aug. 20, 2014

(87) PCT Pub. No.: WO2013/135426
PCT Pub. Date: Sep. 19, 2013

(65) Prior Publication Data
US 2015/0045173 A1  Feb. 12, 2015

(30) Foreign Application Priority Data
Mar. 14, 2012  (DE) .......................... 10 2012 203 936

(51) Int. Cl.
*F16H 3/66* (2006.01)
*B60K 17/08* (2006.01)
*F16H 3/44* (2006.01)

(52) U.S. Cl.
CPC ................ *F16H 3/666* (2013.01); *B60K 17/08* (2013.01); *F16H 2003/445* (2013.01);
(Continued)

(58) Field of Classification Search
CPC ................ F16H 2003/445; F16H 2200/0065; F16H 2200/2012; F16H 2200/2046; F16H 2200/2097

USPC .......................................... 475/275–291, 330
See application file for complete search history.

(56) References Cited

U.S. PATENT DOCUMENTS 4,038,888 A * 8/1977 Murakami et al. ............ 475/276
8,210,981 B2 7/2012 Bauknecht et al.
(Continued)

FOREIGN PATENT DOCUMENTS

DE   10 2008 000 428 A1   9/2009
DE   10 2009 019 046 A1   11/2010
(Continued)

OTHER PUBLICATIONS

German Search Report Corresponding to 10 2012 203 936.8 mailed Nov. 13, 2012, 6 pages.
(Continued)

*Primary Examiner* — Roger Pang
(74) *Attorney, Agent, or Firm* — Davis & Bujold, P.L.L.C.; Michael J. Bujold

(57) ABSTRACT

A four-stage multi-gear transmission in which the carrier of a fourth gearset (4) is connected in a rotationally fixed manner to a housing (72), a ring gear of a first gearset (1) is connected rotationally fixed to a sun gear (41) of the fourth gearset (4), a drive input (70) can couple, via a first clutch (61), a sun gear (11) of the first gearset (1), a ring gear (42) of the fourth gearset (4) can couple, via a second clutch (62), a drive output (71), a carrier (13) of the first gearset (1) can couple, via a first brake (51), a housing (72) and the sun gear (11) of the first gearset (1) can couple, via a second brake (52=), the housing (72). Varying other couplings within the multi-gear transmission can provide a range of transmissions with similar properties.

15 Claims, 6 Drawing Sheets

(52) U.S. Cl.
CPC .. *F16H 2003/447* (2013.01); *F16H 2200/0065* (2013.01); *F16H 2200/2012* (2013.01); *F16H 2200/2046* (2013.01); *F16H 2200/2064* (2013.01); *F16H 2200/2097* (2013.01)

(56) References Cited

U.S. PATENT DOCUMENTS

| | | |
|---|---|---|
| 2009/0118058 A1 | 5/2009 | Suh |
| 2009/0197733 A1 | 8/2009 | Phillips et al. |
| 2014/0018204 A1* | 1/2014 | Mellet et al. .................. 475/275 |
| 2014/0256500 A1* | 9/2014 | Mellet et al. .................. 475/276 |
| 2015/0184724 A1* | 7/2015 | Beck et al. .................... 475/275 |

FOREIGN PATENT DOCUMENTS

| | | | |
|---|---|---|---|
| DE | 10 2009 047 277 A1 | | 6/2011 |
| DE | 10 2009 057 213 A1 | | 6/2011 |
| DE | 102012210868 A1 | * | 1/2014 |
| JP | 2006-349153 A | | 12/2006 |
| WO | WO2013127548 A1 | * | 9/2013 |

OTHER PUBLICATIONS

International Search Report Corresponding to PCT/EP2013/051982 mailed Jul. 11, 2013, 11 pages.
Written Opinion Corresponding to PCT/EP2013/051982 mailed Jul. 11, 2013, 18 pages.

* cited by examiner

MULTISTAGE TRANSMISSION

This application is a National Stage completion of PCT/EP2013/051982 filed Feb. 1, 2013, which claims priority from German patent application serial no. 10 2012 203 936.8 filed Mar. 14, 2012.

FIELD OF THE INVENTION

The invention concerns a multi-gear transmission of planetary design, in particular for a motor vehicle.

BACKGROUND OF THE INVENTION

Such multi-gear transmissions are preferably used as automatic transmissions of motor vehicles, wherein the power flow acting in each gear within the planetary gearset is defined by selective actuation of the shifting elements. Furthermore, in an automatic transmission the planetary gearsets are usually connected to a starting element that is subject to slip and optionally provided with a locking clutch, such as a hydrodynamic torque converter or a liquid clutch.

From DE 10 2008 000 428 A1 a planetary multi-gear transmission is known, in which, in a housing four planetary gearsets and a total of eight rotating shafts are arranged, one of which is the drive input shaft and another the drive output shaft of the multi-gear transmission. In addition, in the area of the shafts at least six shifting elements are provided, by the selective actuation of which the power flow within the four planetary gearsets is varied and such that various transmission ratios between the drive input and the drive output can be defined. In that way, nine forward gears and one reverse gear can be engaged.

SUMMARY OF THE INVENTION

The purpose of the present invention is to indicate an alternative multi-gear transmission, preferably with improved efficiency and with a sufficiently large and sufficiently uniformly distributed range of transmission ratios.

The objective of the invention is achieved by a multi-gear transmission comprising at least four planetary gearsets, a housing, a drive input shaft and a drive output shaft, wherein:
a carrier of the fourth planetary gearset connected to the housing in a rotationally fixed manner,
a ring gear of the first planetary gearset is connected in a rotationally fixed manner to a sun gear of the fourth planetary gearset,
the drive input shaft can be coupled to a sun gear of the first planetary gearset by means of a first clutch,
a ring gear of the fourth planetary gearset can be coupled to the drive output shaft by means of a second clutch,
a carrier of the first planetary gearset can be coupled to the housing by a first brake,
the sun gear of the first planetary gearset can be coupled to the housing by a second brake, and at least four of the following connections are formed permanently whereas at least two of the following connections can be formed detachably by means of at least one shifting element:
connection of a ring gear of the second planetary gearset to the carrier of the first planetary gearset,
connection of the ring gear of the first planetary gearset to a carrier of the second planetary gearset,
connection of the ring gear of the first planetary to a sun gear of a third planetary gearset,
connection of a ring gear of the third planetary gearset to the drive output shaft,
connection of the drive input shaft to a sun gear of the second planetary gearset,
connection of the drive input shaft to a carrier of the third planetary gearset.

A planetary gearset is in particular understood to mean a gearset that comprises at least one sun gear which meshes with one or more planetary gearwheels, a carrier that determines the axes of the planetary gearwheels, and a ring gear which meshes with the planetary gearwheels. Preferably, the ring gear has inner teeth and the sun gear gas outer teeth.

An advantage of the invention can be that the shifting elements of the multi-gear transmission, i.e. the brakes and clutches of the transmission, can be accessed easily from the outside. Thus the actuators, such as electric motors, hydraulic valves, hydraulic pumps and the like, can be arranged close to the shifting elements whereby mechanical and/or hydraulic losses are reduced and less energy may be required for actuating the shifting elements. Less energy may also be needed for maintaining a shifting element in its current operating condition at the time, namely open or closed, for example since by virtue of short pressure lines pressure losses are also lower. This also makes it possible to arrange shifting elements on the housing and therefore at least in part rotationally fixed, such that seals that connect a static line with a rotating line can be wholly or partially avoided.

The spatial arrangement of shifting elements that are easily accessible also simplifies the replacement of the usually hydraulically actuated disk clutches or disk brakes, for example by electro-mechanically or electro-hydraulically actuated brakes and clutches, which can be comparatively simply actuated as necessary. Easily accessible shifting elements are on the one hand brakes that couple a shaft to the housing in a rotationally fixed manner, but also shifting elements on external shafts of the multi-gear transmission, preferably on the drive input shaft or the drive output shaft, to these brakes the hydraulic fluid needed for actuation of these brakes can be supplied comparatively simply.

Besides this characteristic, the multi-gear transmission also has good gearing efficiency, only slight loading of the components, in particular planetary gearsets and shifting element torques, low absolute and relative rotation speeds, and/or little structural complexity. The latter feature enables the multi-gear transmission to be produced with relatively low weight and for low cost. Finally, the multi-gear transmission also provides a good transmission ratio range, i.e. a user-friendly gear gradation.

In general, a preferred embodiment of the multi-gear transmission has four planetary gearsets, four clutches, two brakes and a fixed housing coupling.

By actuation of two shifting elements at a time (brakes and/or clutches), nine forward gears and one reverse gear can be engaged, whereas for the fourth gear another three alternative shift positions are available.

As the starting element a hydrodynamic torque converter, a hydrodynamic clutch, an additional starting clutch, an integrated starting clutch or brake and/or an additional electric machine can be used.

In principle an electric machine or some other force/power source can be arranged on any shaft. Moreover, in principle a freewheel can be arranged on any shaft, to the housing or to another shaft.

Preferably, the multi-gear transmission is configures as a standard drive unit although a front transverse configuration is also conceivable.

All the shifting elements can be frictional or interlocking. Preferably, however, the clutch that connects the drive input shaft to the sun gear of the first planetary gearset and/or the clutch that connects the ring gear of the fourth planetary gearset to the drive output shaft are in the form of interlocking clutches, in particular claw clutches, which results in substantially better efficiency and hence substantial fuel consumption advantages.

In this case it was realized that when shifting through from the first to the ninth gear the first and second clutches have to be actuated only once, so those shifting elements are particularly suitable to be designed as claw clutches. Furthermore, it was realized that in the case of those two shifting elements, owing to their comparatively infrequent actuation, the advantage of better efficiency outweighs the disadvantage of more difficult manipulation. In particular, it was recognized that the two shifting elements can be actuated in comparatively high gears, whereby the rotational speed difference between the shafts can be small and therefore favorable for the actuation of a claw clutch.

The geometrical position (sequence) of the individual gearsets can be freely chosen provided that it permits the appropriate connections between elements. Thus, the position of individual elements can be modified as desired.

Other advantageous variants of the multi-gear transmission emerge from the description in combination with the figures. These all have the same functional properties as the main system, in particular the same efficiency, the same gradation, etc.

BRIEF DESCRIPTION OF THE DRAWINGS

For the better understanding of the invention, it is described in more detail with reference to the figures shown below.

The figures shown in each case in greatly simplified schematic form.

DETAILED DESCRIPTION OF THE PREFERRED EMBODIMENTS

By way of introduction it should be noted that in the various embodiments described the same components are given the same indexes, so that in the disclosures given throughout the description, components with the same indexes can be logically regarded as equivalent. Likewise, positional details chosen in the description, such as above, below, lateral, etc., refer to the figure being described at the time and in the event of a position change should be logically transferred to the new position. Furthermore, individual features or combinations thereof in the various example embodiments shown and described, represent inventive solutions in their own right or ones according to the invention.

Figure 1:
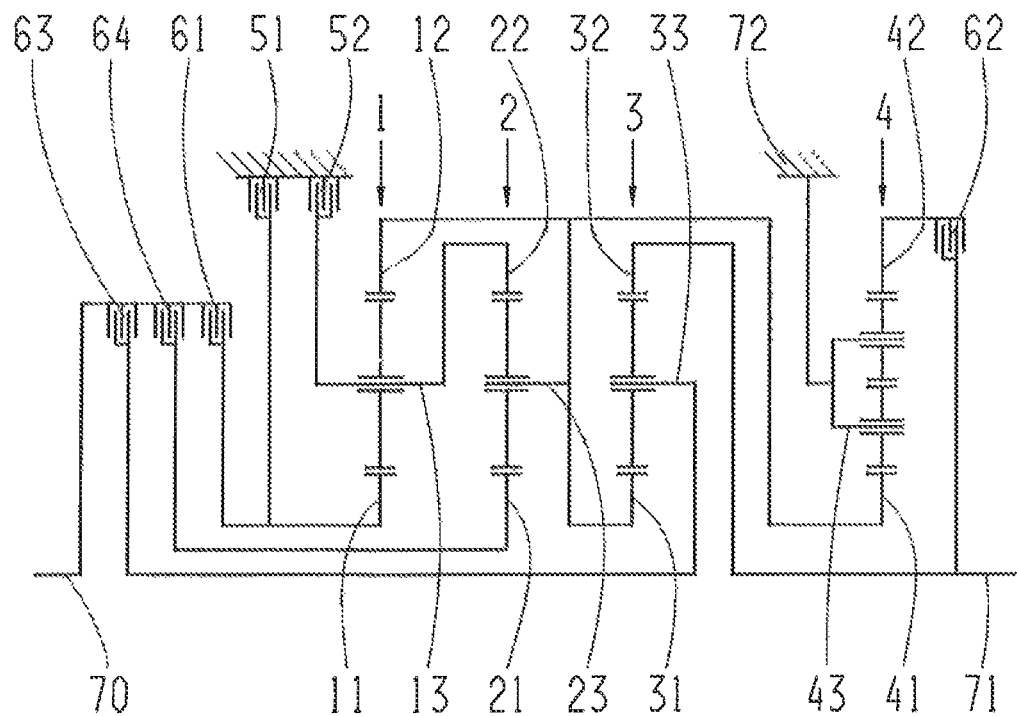
FIG. 1: A first, schematically represented example variant of a multi-gear transmission according to the invention.

FIG. 1 shows a multi-gear transmission comprising four planetary gearsets 1, 2, 3, 4, a drive input shaft 70, a drive output shaft 71, six further rotating shafts and six shifting elements 51, 52, 61, 62, 63, 64, of which two are brakes 51, 52 and four are clutches 61, 62, 63, 64. The four planetary gearsets 1, 2, 3, 4 are arranged one after another in the sequence of the first planetary gearset 1, the second planetary gearset 2, the third planetary gearset 3 and the fourth planetary gearset 4. The first, second and third planetary gearsets 1, 2, 3 are in the form of minus planetary gearsets, whereas the fourth planetary gearset is a plus planetary gearset. The planetary gearsets 1, 2, 3, 4 are accommodated together in a housing 72. In the multi-gear transmission variant shown in FIG. 1:

a carrier of the fourth planetary gearset 4 is connected to a housing 72 in a rotationally fixed manner, a ring gear of the first planetary gearset 1 is connected in a rotationally fixed manner to a sun gear of the fourth planetary gearset 4, the drive input shaft 70 can be coupled by the first clutch 61 to a sun gear 11 of the first planetary gearset 1, a ring gear 42 of the fourth planetary gearset 4 can be coupled by a second clutch 62 to the drive output shaft 71, a carrier 13 of the first planetary gearset 1 can be coupled by a second brake 52 to the housing 72, the sun gear 11 of the first planetary gearset 1 can be coupled by a first brake 51 to the housing 72, the ring gear 22 of the second planetary gearset 2 is permanently connected to the carrier 13 of the first planetary gearset 1, the ring gear 12 of the first planetary gearset 1 is permanently connected to the carrier 23 of the second planetary gearset 2, the ring gear 12 of the first planetary gearset 1 is permanently connected to the sun gear 31 of the third planetary gearset 3, the ring gear 32 of the third planetary gearset 3 is permanently connected to the drive output shaft 71, the drive input shaft 70 can be coupled by a fourth clutch 64 to the sun gear 21 of the second planetary gearset 2, and the drive input shaft 70 can be coupled by a third clutch 63 to the carrier 33 of the third planetary gearset 3.

Figure 2:
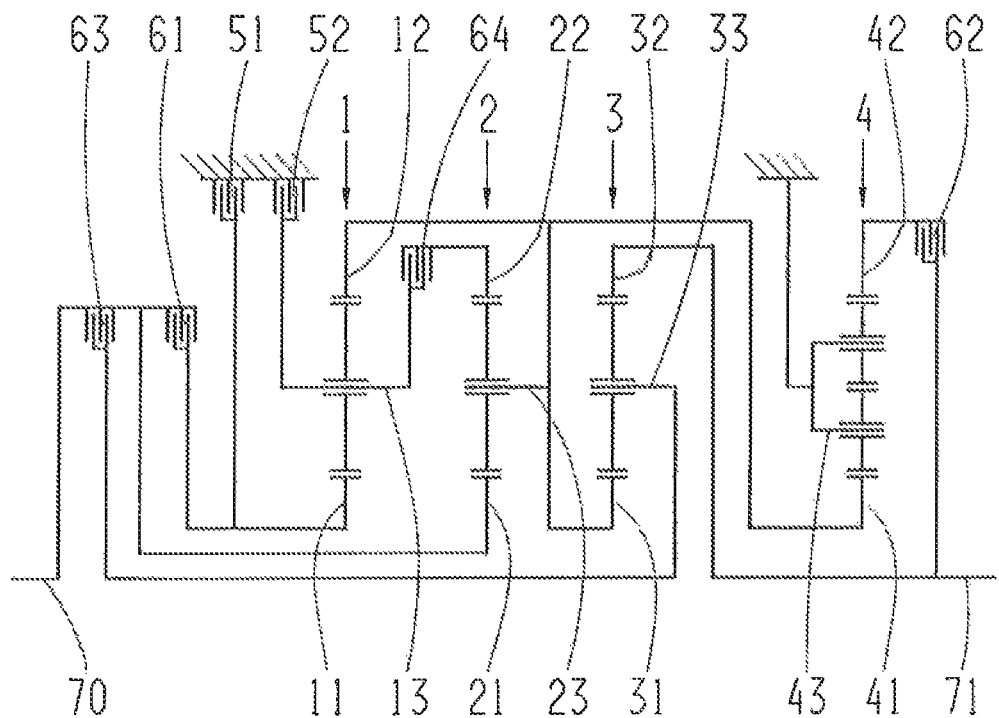
FIG. 2: A second, schematically represented example variant of a multi-gear transmission according to the invention.

FIG. 2 shows a multi-gear transmission very similar to the multi-gear transmission of FIG. 1, but which differs therefrom in the following particulars:

The ring gear 22 of the second gearset 2 can be coupled by a fourth clutch 64 to the carrier 13 of the first gearset 1, and the drive input 70 is permanently connected to the sun gear 21 of the second gearset 2.

Figure 3:
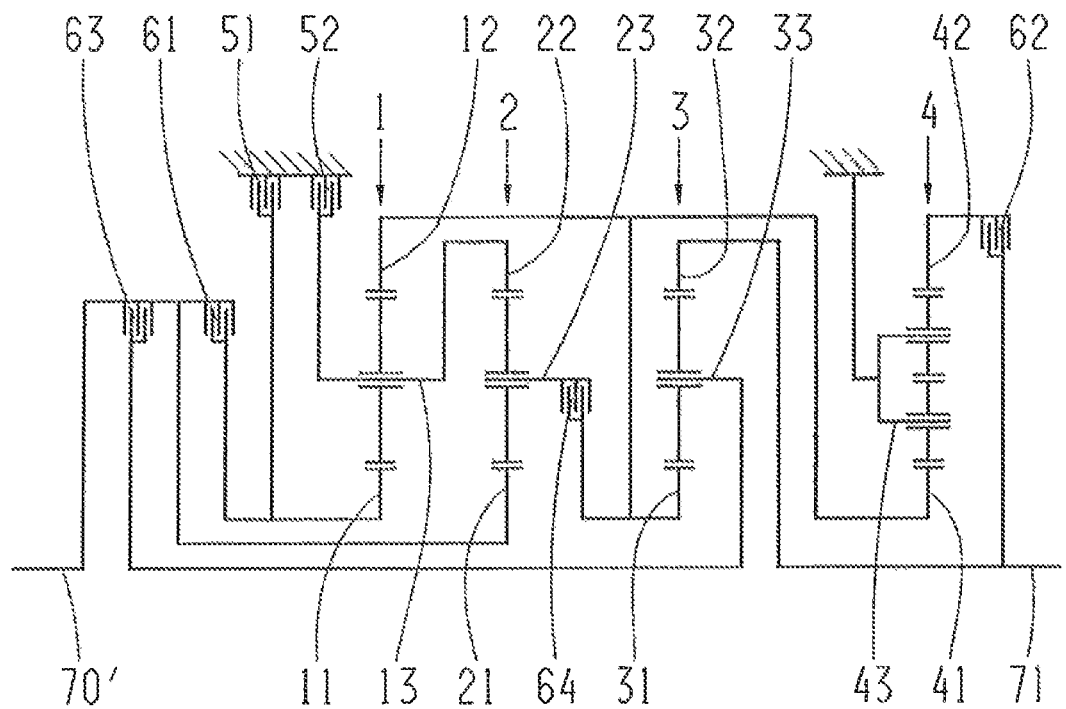
FIG. 3: A third, schematically represented example variant of a multi-gear transmission according to the invention.

FIG. 3 shows a further multi-gear transmission very similar to the multi-gear transmission of FIG. 1, but which differs from the embodiment of FIG. 1 in the following particulars:

The ring gear 12 of the first gearset 1 can be coupled by a fourth clutch 64 to the carrier 23 of the second gearset 2, and the drive input shaft 70 is permanently connected to the sun gear 21 of the second gearset 2.

Figure 4:
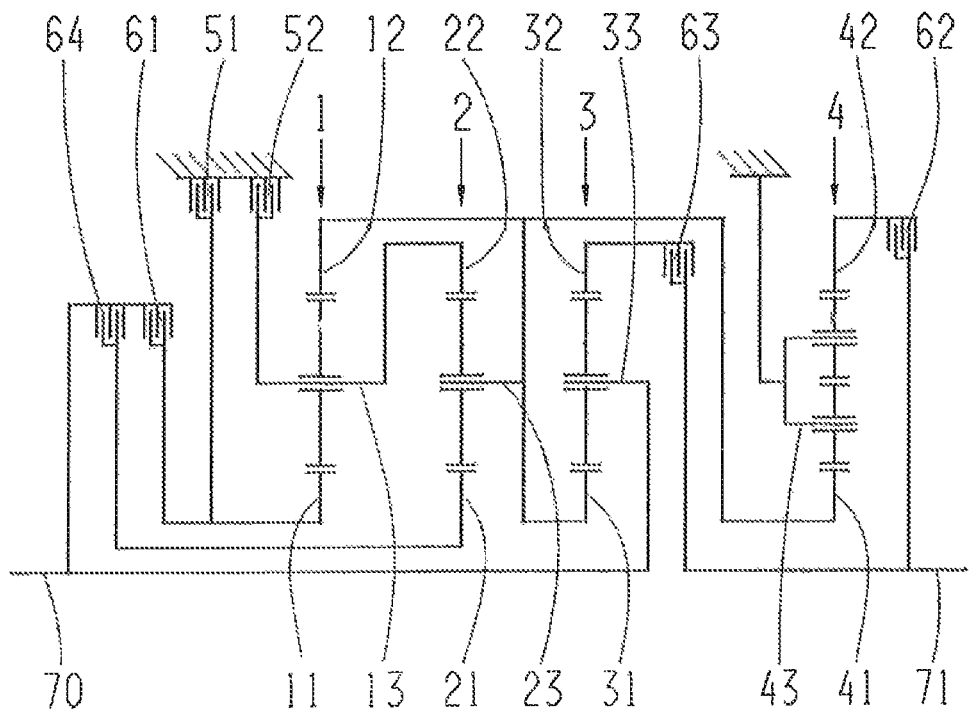
FIG. 4: A fourth, schematically represented example variant of a multi-gear transmission according to the invention.

FIG. 4 shows another variant of a mufti-gear transmission comprising four planetary gearsets 1, 2, 3, 4, a drive input shaft 70, a drive output shaft 71, six further rotating shafts and six shifting elements 51, 52, 61, 62, 63, 64 of which two 51, 52 are brakes and four 61, 62, 63, 64 are clutches. The four planetary gearsets 1, 2, 3, 4 are arranged one after another in the sequence of the first planetary gearset 1, the second planetary gearset 2, the third planetary gearset 3 and the fourth planetary gearset 4. The first, second and third planetary gearsets 1, 2, 3 are in the form of minus planetary gearsets whereas the fourth planetary gearset 4 is a plus planetary gearset. The planetary gearsets 1, 2, 3, 4 are jointly accommodated in a housing 72. In the variant shown in FIG. 4:

the carrier of the fourth planetary gearset 4 is connected rotationally fixed to the housing 72, the ring gear of the first planetary gearset 1 is connected rotationally fixed to the sun gear 41 of the fourth planetary gearset 4, the drive input shaft 70 can be coupled by a first clutch 61 to the sun gear 11 of the first planetary gearset 1, the ring gear 42 of the fourth planetary gearset 4 can be coupled by a second clutch 62 to the drive output shaft 71, the carrier 13 of the first gearset 1 can be coupled by a second brake 52 to a housing 72, the sun gear 11 of the first gearset 1 can be coupled by a first brake 51 to the housing 72, the ring gear of the second gearset 2 is permanently connected to the carrier 13 of the first gearset 1, the ring gear 12 of the first gearset 1 is permanently connected to a carrier 23 of the second gearset 2, the ring gear 12 of the first gearset 1 is permanently connected to the sun gear of the third gearset 3, the ring gear 32 of the third gearset 3 can be coupled by a third clutch 63 to the drive output shaft 71, the drive input shaft 70 can be coupled by a fourth clutch 64 to the sun gear 21 of the second gearset 2, and the drive input shaft 70 is permanently connected to the carrier 33 of the third gearset 3.

Figure 5:
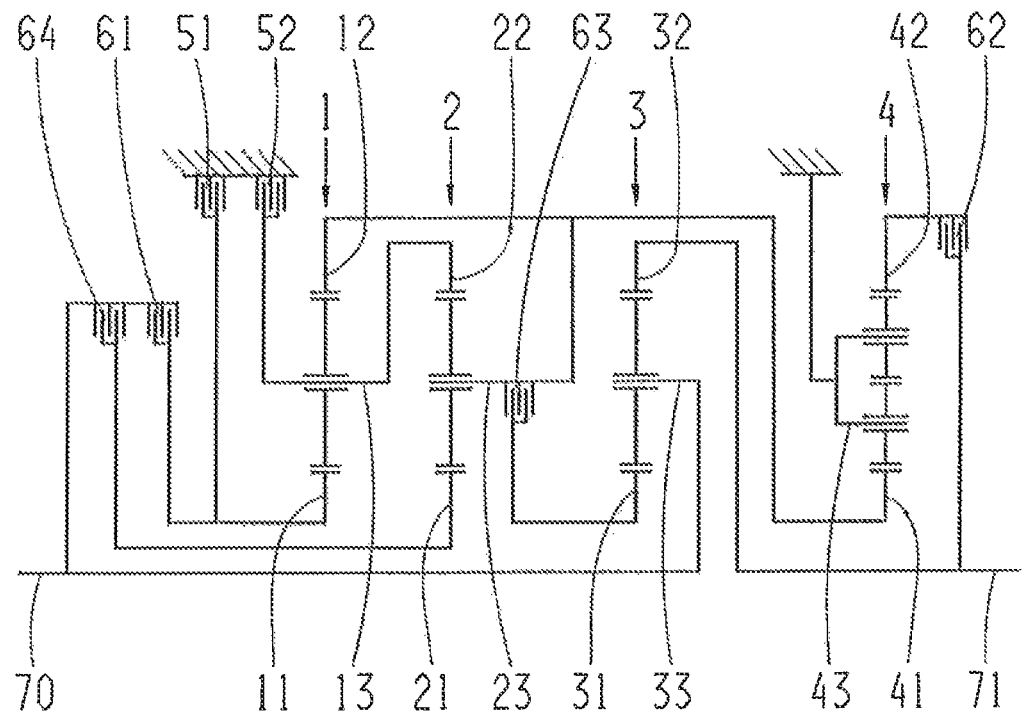
FIG. 5: A fifth, schematically represented example variant of a multi-gear transmission according to the invention.

FIG. 5 shows a multi-gear transmission that differs from the multi-gear transmission of FIG. 4 in the following particulars: the ring gear 12 of the first gearset 1 can be coupled by a third clutch 63 to the sun gear of the third gearset 3, and the ring gear 32 of the third gearset 3 is permanently connected to the drive output shaft 71.

Figure 6:
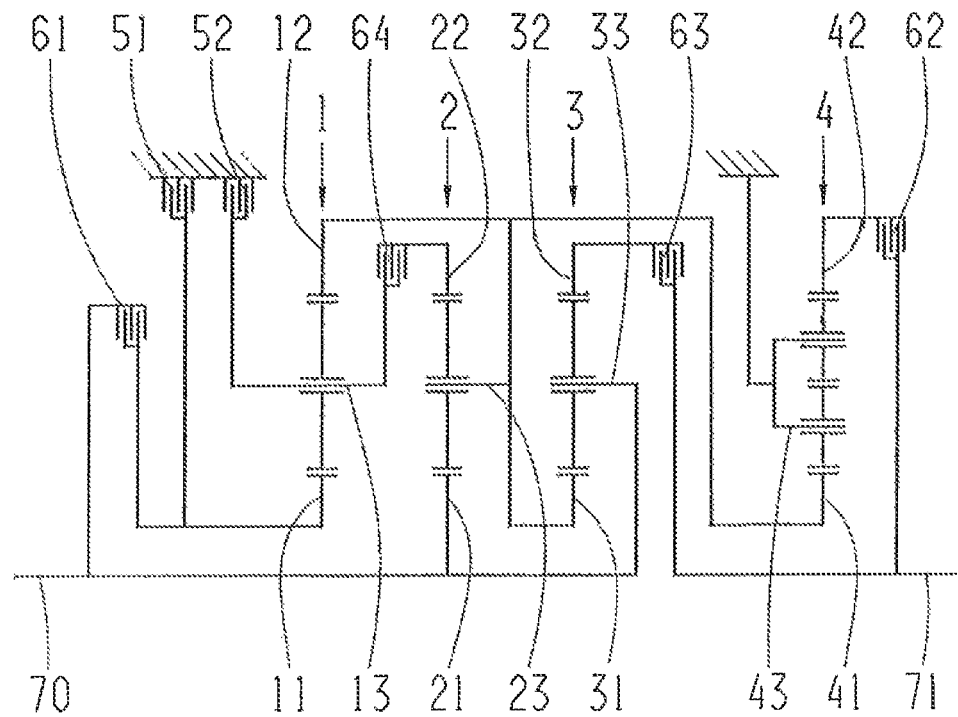
FIG. 6: A sixth, schematically represented example variant of a multi-gear transmission according to the invention.
Figure 7:
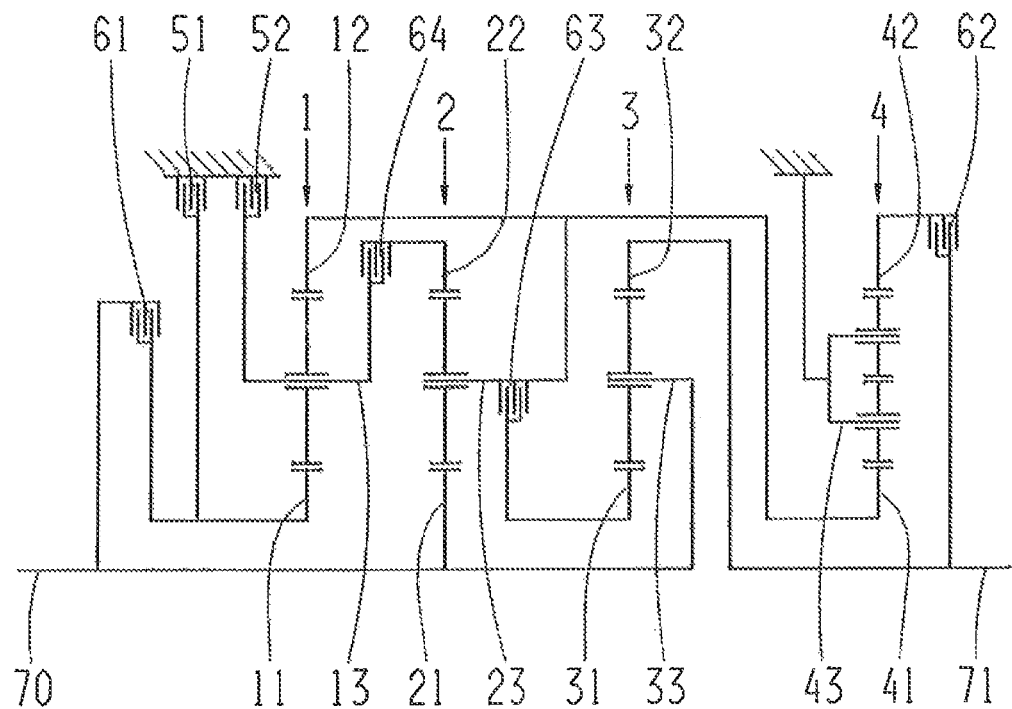
FIG. 7: A seventh, schematically represented example variant of a multi-gear transmission according to the invention.

FIG. 6 shows a multi-gear transmission that differs from the multi-gear transmission of FIG. 4 in the following particulars: the ring gear of the second gearset 2 can be coupled by a fourth clutch 64 to the carrier 13 of the first gearset 1, and the drive input shaft 70 is permanently connected to a sun gear 21 of the second gearset 2.

Furthermore, the sun gear of the second gearset 2 is permanently connected to the drive input shaft.

Figure 8:
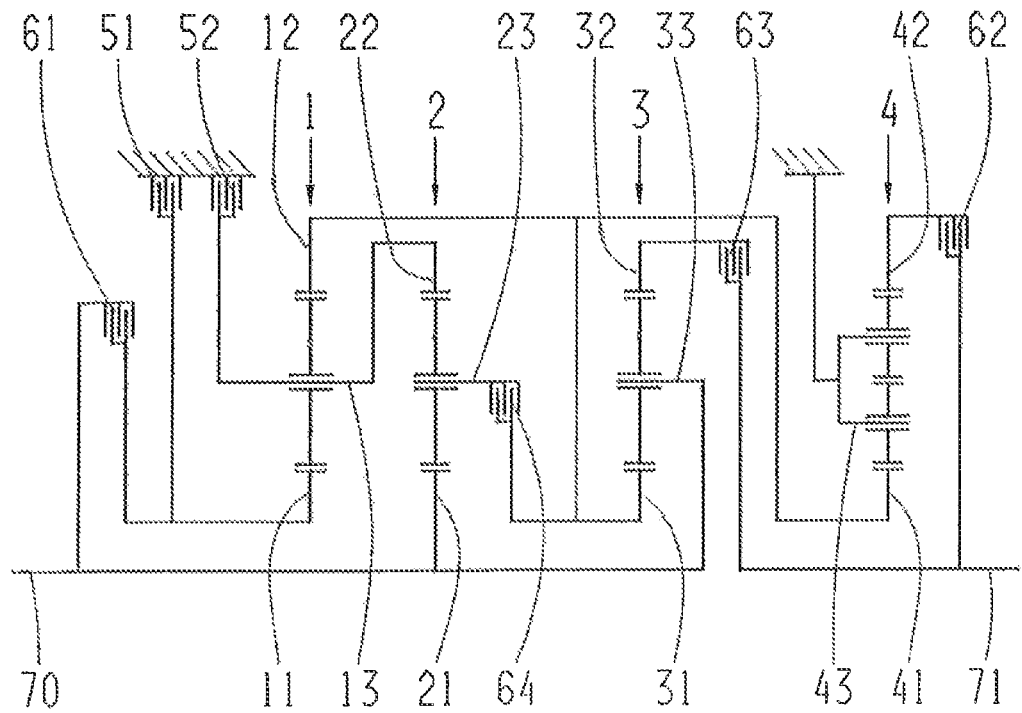
FIG. 8: A eighth, schematically represented example variant of a multi-gear transmission according to the invention.

FIG. 8 shows a multi-gear transmission very similar to the multi-gear transmission of FIG. 6, and in which only the points h) and k) are differently designed. To be specific: the ring gear 12 of the first gearset 1 can be coupled by a fourth clutch 64 to a carrier 23 of the second gearset 2, and the drive input 70 is permanently connected to a sun gear 21 of the second gearset 2.

Figure 9:
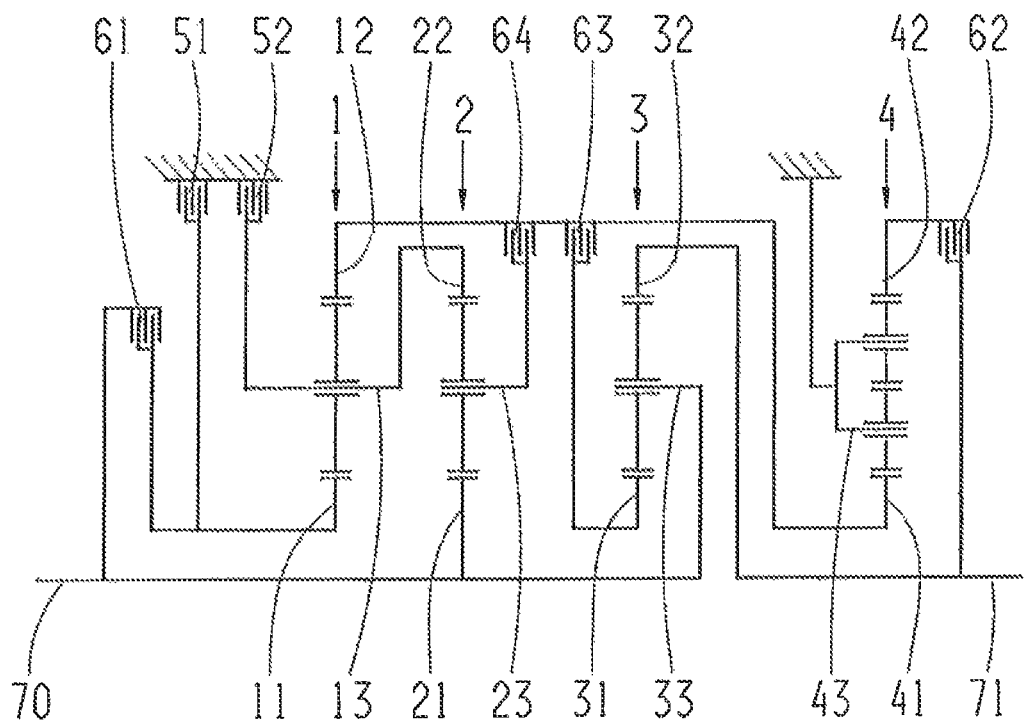
FIG. 9: A ninth, schematically represented example variant of a multi-gear transmission according to the invention.

Finally, FIG. 9 shows a multi-gear transmission that differs from the multi-gear transmission of FIG. 8 in the following particulars:

The ring gear 12 of the first gearset 1 can be coupled by a third clutch 63 to a sun gear of a third gearset 3, and a ring gear 32 of the third gearset 3 is permanently connected to the drive output 71.

With all the multi-gear transmissions shown in FIGS. 1 to 9 the following gears can be engaged:

A first gear can be obtained by closing the second brake 52, the second clutch 62 and the fourth clutch 64.

A second gear can be obtained by closing the first brake 51, the second clutch 62 and the fourth clutch 64.

A third gear can be obtained by closing the first, second and fourth clutches 61, 62 and 64.

A fourth gear can be obtained by closing the second, third and fourth clutches 62, 63 and 64, or by closing the first brake 51, the second clutch 62 and the third clutch 63, or by closing the first, second and third clutches 61, 62 and 63.

A fifth gear can be obtained by closing the first clutch 61, the third clutch 63 and the fourth clutch 64.

A sixth gear can be obtained by closing the first brake 51, the third clutch 63 and the fourth clutch 64.

A seventh gear can be obtained by closing the second brake 52, the third clutch 63 and the fourth clutch 64.

An eighth gear can be obtained by closing the first brake 51, the second brake 52 and the third clutch 63.

A ninth gear can be obtained by closing the second brake 52, the first clutch 61 and the third clutch 63.

A reverse gear can be obtained by closing the second brake 52, the first clutch 61 and the second clutch 62.

In all cases, the shifting elements not mentioned are open. Preferably, in the multi-gear transmissions shown:

the first gearset 1 is a minus gearset, the second gearset 2 is a minus gearset, the third gearset 3 is a minus gearset, and the fourth gearset 4 is a plus gearset.

In an advantageous variant the transmission ratio of:

the first gearset 1 between the sun gear 11 and the ring gear 12 equals −2.015, and the second gearset 2 between the sun gear 21 and the ring gear 22 equals −1.600, and the third gearset 3 between the sun gear 31 and the ring gear 32 equals −1.700, and the fourth gearset 4 between the sun gear 41 and the ring gear 42 equals +1.804.

Figure 1A:
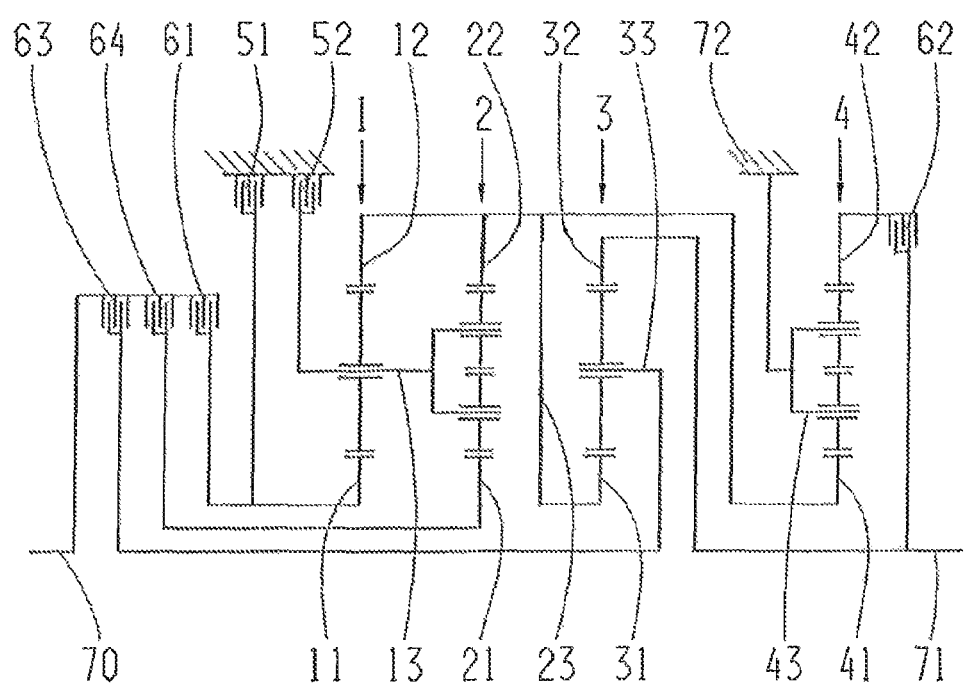
FIG. 1A shows a variant of this figure.

In general, instead of a first-mentioned connection/coupling to a carrier 13, 23, 33, 43 of a gearset 1, 2, 3, 4 and a second-mentioned connection/coupling to a ring gear 12, 22, 32, 42 of the gearset 1, 2, 3, 4, the first-mentioned connection/coupling can be made to the ring gear 12, 22, 32, 42 of the gearset 1, 2, 3, 4 and the second-mentioned connection/coupling can be made to the carrier 13, 23, 33, 43 of the gearset 1, 2, 3, 4, whereby the gearset 1, 2, 3, 4, instead of being a minus gearset, becomes a plus gearset or instead of being a plus gearset, becomes a minus gearset. In other words, the connections/couplings to the carrier 13, 23, 33, 43 and to the ring gear 12, 22, 32, 42 of a gearset 1, 2, 3, 4 are interchanged and the rotational direction between the sun gear 11, 21, 31, 41 and the ring gear 12, 22, 32, 42 of this gearset 1, 2, 3, 4, is reversed. An example of such variation is shown in FIG. 1A of the drawings. In the layout of the multi-gear transmission it should also be noted that the value of the fixed transmission ratio of the gearset should be increased or reduced by 1, respectively, if the shiftable transmission ratios between the drive input 70 and the drive output 71 are otherwise to remain unchanged. By virtue of the variation of the gearsets 1, 2, 3, 4 the connection/coupling between the individual transmission elements can therefore be varied without thereby changing the characteristic of the transmission. This possibility provides for a large number of design variants which, in individual cases, may simplify the production of the transmission. The aforesaid interchanging of the connection/coupling is not restricted to just one gearset 1, 2, 3, 4 but can also be implemented in more than one gearset 1, 2, 3, 4.

The example embodiments illustrate possible embodiment variants of a multi-gear transmission according to the invention, but at this point it should be said that the invention is not limited specifically to the embodiment variants thereof illustrated, but rather, the individual embodiment variants can be combined with one another and such possible variation lies within the competence of a specialist active in the technical field concerned by virtue of vocational training in technical procedures by objective innovation. In particular, the options arising from such combinations but not explicitly illustrated in the figures are covered by the scope of protection. Furthermore, all conceivable embodiment variants made possible by combinations of individual details of the embodiment variants illustrated and described are also covered by the scope of protection.

For the sake of completeness let it finally be pointed out that for the better understanding of the structure of the multi-gear transmission, the structure has been illustrated in the figures in a schematic manner, and in reality therefore, it can comprise more components, fewer components or even components other than those shown. In general, the specific design details lie within the scope of specialized knowledge of the field.

The objectives addressed by the independent inventive solutions emerge from the description.

INDEXES

1 First transmission gearset
2 Second transmission gearset
3 Third transmission gearset
4 Fourth transmission gearset
11 Sun gear of the first transmission gearset
12 Ring gear of the first transmission gearset
13 Carrier of the first transmission gearset
21 Sun gear of the second transmission gearset
22 Ring gear of the second transmission gearset
23 Carrier of the second transmission gearset
31 Sun gear of the third transmission gearset
32 Ring gear of the third transmission gearset
33 Carrier of the third transmission gearset
41 Sun gear of the fourth transmission gearset
42 Ring gear of the fourth transmission gearset
43 Carrier of the fourth transmission gearset
51 First brake
52 Second brake
61 First clutch
62 Second clutch
63 Third clutch
64 Fourth clutch
70 Drive input
71 Drive output
72 Housing

The invention claimed is:

1. A multi-gear transmission comprising:
   at least first, second, third and fourth planetary gearsets (1, 2, 3, 4) arranged in a housing (72), and each of the first, the second, the third and the fourth planetary gearsets comprising a ring gear, a sun gear and a carrier;
   a drive input shaft (70) and a drive output shaft (71);
   the carrier of the fourth planetary gearset (4) being connected in a rotationally fixed manner to the housing (72);
   the ring gear of the first planetary gearset (1) being connected in a rotationally fixed manner to the sun gear (41) of the fourth planetary gearset (4);
   the drive input shaft (70) being couplable, via a first clutch (61), to the sun gear (11) of the first planetary gearset (1);
   the ring gear (42) of the fourth planetary gearset (4) being couplable, via a second clutch (62), to the drive output shaft (71);
   the carrier (13) of the first planetary gearset (1) being couplable, via a second brake (52), to the housing (72);
   the sun gear (11) of the first planetary gearset (1) being couplable, via a first brake (51), to the housing (72); and
   at least four of the following connections are continuous connections and at least two of the following connections are designed to be detachable connections by at least one shifting element:
      a connection of the ring gear (22) of the second planetary gearset (2) to the carrier (13) of the first planetary gearset (1),
      a connection of the ring gear (12) of the first planetary gearset (1) to the carrier (23) of the second planetary gearset (2),
      a connection of the ring gear (12) of the first planetary gearset (1) to the sun gear (31) of a third planetary gearset (3),
      a connection of the ring gear (32) of the third planetary gearset (3) to the drive output shaft (71),
      a connection of the drive input shaft (70) to the sun gear (21) of the second planetary gearset (2), and
      a connection of the drive input shaft (70) to the carrier (33) of the third planetary gearset (3).

2. The multi-gear transmission according to claim 1, wherein
   the ring gear (12) of the first planetary gearset (1) is continuously connected to the sun gear (31) of the third planetary gearset (3);
   the ring gear (32) of the third planetary gearset (3) is continuously connected to the drive output shaft (71); and
   the drive input shaft (70) is couplable, via a third clutch (63), to the carrier (33) of the third planetary gearset (3).

3. The multi-gear transmission according to claim 2, wherein
   the ring gear (22) of the second planetary gearset (2) is continuously connected or is couplable to the carrier (13) of the first planetary gearset (1);
   the ring gear (12) of the first planetary gearset (1) is continuously connected or is couplable to the carrier (23) of the second planetary gearset (2);
   the ring gear (12) of the first planetary gearset (1) is continuously connected or is couplable to the sun gear (31) of the third planetary gearset (3);
   the ring gear (32) of the third planetary gearset (3) is continuously connected or is couplable to the drive output shaft (71);
   the drive input shaft (70) is continuously connected to the sun gear (21) of the second planetary gearset (2) or is couplable thereto by a fourth clutch (64),
   wherein two of the above connections are permanent and one of the connections is formed by the fourth clutch.

4. The multi-gear transmission according to claim 1, wherein the drive input shaft (70) is continuously connected to the carrier (33) of the third planetary gearset (3).

5. The multi-gear transmission according to claim 1, wherein
   the ring gear (22) of the second planetary gearset (2) is continuously connected to the carrier (13) of the first planetary gearset (1);
   the ring gear (12) of the first planetary gearset (1) is continuously connected to the carrier (23) of the second planetary gearset (2);
   the ring gear (12) of the first planetary gearset (1) is continuously connected to the sun gear of a third planetary gearset (3);
   the ring gear (32) of the third planetary gearset (3) is couplable, via a third clutch (63), to the drive output shaft (71); and the drive input shaft (70) is couplable, via a fourth clutch (64), to the sun gear (21) of the second planetary gearset (2).

6. The multi-gear transmission according to claim 4, wherein
the ring gear (22) of a second planetary gearset (2) is continuously connected to the carrier (13) of the first planetary gearset (1);
the ring gear (12) of the first planetary gearset (1) is continuously connected to the carrier (23) of the second planetary gearset (2);
the ring gear (12) of the first planetary gearset (1) is couplable, via a third clutch (63), to the sun gear of a third planetary gearset (3);
the ring gear (32) of the third planetary gearset (3) is continuously connected to the drive output shaft (71); and
the drive input shaft (70) is couplable, via a fourth clutch (64), to the sun gear (21) of the second planetary gearset (2).

7. The multi-gear transmission according to claim 4, wherein
the ring gear (22) of a second planetary gearset (2) is couplable, via a fourth clutch (64), to the carrier (13) of the first planetary gearset (1);
the ring gear (12) of the first planetary gearset (1) is continuously connected to the carrier (23) of the second planetary gearset (2);
the ring gear (12) of the first planetary gearset (1) is continuously connected to the sun gear of a third planetary gearset (3);
the ring gear (32) of the third planetary gearset (3) is couplable, via a third clutch (63), to the drive output shaft (71); and
the drive input shaft (70) is continuously connected to the sun gear (21) of the second planetary gearset (2).

8. The multi-gear transmission according to claim 4, wherein
the ring gear (22) of a second planetary gearset (2) is couplable, via a fourth clutch (64), to the carrier (13) of the first planetary gearset (1);
the ring gear (12) of the first planetary gearset (1) is continuously connected to the carrier (23) of the second planetary gearset (2);
the ring gear (12) of the first planetary gearset (1) is couplable, via a third clutch (63), to the sun gear of a third planetary gearset (3);
the ring gear (32) of the third planetary gearset (3) is permanently connected to the drive output shaft (71); and
the drive input shaft (70) is continuously connected to the sun gear (21) of the second planetary gearset (2).

9. The multi-gear transmission according to claim 4, wherein
the ring gear (22) of a second planetary gearset (2) is continuously connected to the carrier (13) of the first planetary gearset (1);
the ring gear (12) of the first planetary gearset (1) is couplable, via a fourth clutch (64), to the carrier (23) of the second planetary gearset (2);
the ring gear (12) of the first planetary gearset (1) is continuously connected to the sun gear of a third planetary gearset (3);
the ring gear (32) of the third planetary gearset (3) is couplable, via a third clutch (63), to the drive output shaft (71); and
the drive input shaft (70) is continuously connected to the sun gear (21) of the second planetary gearset (2).

10. The multi-gear transmission according to claim 4, wherein
the ring gear (22) of a second planetary gearset (2) is continuously connected to the carrier (13) of the first planetary gearset (1);
the ring gear (12) of the first planetary gearset (1) is couplable, via a fourth clutch (64), to the carrier (23) of the second planetary gearset (2);
the ring gear (12) of the first planetary gearset (1) is couplable, via a third clutch (63), to the sun gear of a third planetary gearset (3);
the ring gear (32) of the third planetary gearset (3) is continuously connected to the drive output shaft (71);
the drive input shaft (70) is continuously connected to the sun gear (21) of the second planetary gearset (2).

11. The multi-gear transmission according to claim 3, wherein selective engagement of the first and the second brakes and the first, the second, the third and the fourth clutches implements first, second, third, fourth, fifth, six, seventh, eighth and ninth gears and a reverse gear, wherein
the first gear is implemented by engagement of the second brake (52), the second clutch (62) and the fourth clutch (64);
the second gear is implemented by engagement of the first brake (51), the second clutch (62) and the fourth clutch (64);
the third gear is implemented by engagement of the first clutch (61), the second clutch (62) and the fourth clutch (64);
the fourth gear is implemented by engagement of the second clutch (62) the third clutch (63) and one of the fourth clutch (64), the first brake (51), the second brake (52) and the first clutch (61);
the fifth gear is implemented by engagement of the first clutch (61), the third clutch (63) and the fourth clutch (64);
the sixth gear is implemented by engagement of the first brake (51), the third clutch (63) and the fourth clutch (64);
the seventh gear is implemented by engagement of the second brake (52), the third clutch (63) and the fourth clutch (64);
the eighth gear is implemented by engagement of the first brake (51), the second brake (52) and the third clutch (63);
the ninth gear is implemented by engagement of the second brake (52), the first clutch (61) and the third clutch (63); and
the reverse gear is implemented by engagement of the second brake (52), the first clutch (61) and the second clutch (62).

12. The multi-gear transmission according to claim 1, wherein the first, the second and the third planetary gearsets (1, 2, 3) are minus planetary gearsets, and the fourth planetary gearset (4) is a plus planetary gearset.

13. The multi-gear transmission according to claim 12, wherein at least one of:
a transmission ratio of the first planetary gearset (1), between the sun gear (11) and the ring gear (12) thereof, is equal to −2.015,
a transmission ratio of the second planetary gearset (2), between the sun gear (21) and the ring gear (22) thereof, is equal to −1.600, a transmission ratio of the third planetary gearset (3), between the sun gear and the ring gear (32) thereof, is equal to −1.700, and a transmission ratio of the fourth planetary gearset (4), between the sun gear (41) and the ring gear (42) thereof, is equal to +1.804.

14. The multi-gear transmission according to claim 1, wherein the second clutch (62), that connects the ring gear (42) of the fourth planetary gearset (4) to the drive output shaft (71), and the first clutch (61), that connects the drive input shaft (70) to the sun gear (21) of the first planetary gearset (1), are claw clutches.

15. A multi-gear transmission comprising:
at least first, second, third and fourth planetary gearsets (1, 2, 3, 4) arranged in a housing (72), and each of the first (R), the second (S), the third (C) and the fourth planetary gearsets comprising a first element, a second element and a third element;
a drive input shaft (70) and a drive output shaft (71);
the first element of the fourth planetary gearset (4) being connected in a rotationally fixed manner to the housing (72);
the first element of the first planetary gearset (1) being connected in a rotationally fixed manner to the second element of the fourth planetary gearset (4);
the drive input shaft (70) being couplable, via a first clutch (61), to the second element of the first planetary gearset (1);
the third element of the fourth planetary gearset (4) being couplable, via a second clutch (62), to the drive output shaft (71);
the third element of the first planetary gearset (1) being couplable, via a second brake (52), to the housing (72);
the second element of the first planetary gearset (1) being couplable, via a first brake (51), to the housing (72); and
at least four of the following connections are continuous connections and at least two of the following connections are designed to be detachable connections by at least one shifting element:
a connection of the first element of the second planetary gearset (2) to the third element of the first planetary gearset (1),
a connection of the first element of the first planetary gearset (1) to the third element of the second planetary gearset (2),
a connection of the first element of the first planetary gearset (1) to the second element of a third planetary gearset (3),
a connection of the first element of the third planetary gearset (3) to the drive output shaft (71),
a connection of the drive input shaft (70) to the second element of the second planetary gearset (2), and
a connection of the drive input shaft (70) to the third element of the third planetary gearset (3);
the second element is a sun gear, and
for each of the first, the second, the third and the fourth planetary gear set which are configured as a minus gear set, the third element is a carrier of that planetary gear set and the first element is a ring gear of the planetary gear set;
while for each of the first, the second, the third and the fourth planetary gear set which are configured as a plus-gear set, the third element is a ring gear of that plus planetary gear set and the first element is a carrier of that plus planetary gear set.

* * * * *